United States Patent
Dechatre et al.

(10) Patent No.: US 11,061,564 B2
(45) Date of Patent: Jul. 13, 2021

(54) DISPLAY DEVICE, DISPLAY SYSTEM COMPRISING SUCH A DEVICE, RELATED DISPLAY METHOD AND COMPUTER PROGRAM

(71) Applicant: THALES, Courbevoie (FR)

(72) Inventors: Maxime Dechatre, Mérignac (FR); Emmanuel Humbert, Mérignac (FR); Maxime Caillaud, Mérignac (FR); Yannick Le Roux, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/843,275

(22) Filed: Apr. 8, 2020

(65) Prior Publication Data

US 2020/0326849 A1 Oct. 15, 2020

(30) Foreign Application Priority Data

Apr. 15, 2019 (FR) ...................... 19 03986

(51) Int. Cl.
*G06F 3/0488* (2013.01)
*G06F 3/041* (2006.01)
*G06F 3/0484* (2013.01)
*G06F 3/0485* (2013.01)
*G06F 3/044* (2006.01)

(52) U.S. Cl.
CPC ........ *G06F 3/04886* (2013.01); *G06F 3/0418* (2013.01); *G06F 3/0485* (2013.01); *G06F 3/04842* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2012/0056836 A1 | 3/2012 | Cha et al. | |
| 2013/0321340 A1* | 12/2013 | Seo | G06F 3/04845 345/174 |
| 2014/0149922 A1* | 5/2014 | Hauser | G06F 3/0488 715/784 |

(Continued)

FOREIGN PATENT DOCUMENTS

EP 3 447 623 A1 2/2019

OTHER PUBLICATIONS

French Search Report, from the French Patent Office in counterpart French Application No. 1903986, dated Dec. 4, 2019.

*Primary Examiner* — Amare Mengistu
*Assistant Examiner* — Sarvesh J Nadkarni
(74) *Attorney, Agent, or Firm* — Arent Fox LLP

(57) ABSTRACT

An electronic device for displaying data on a display screen is able to be linked to a touch-sensitive surface and to the display screen. The display device comprises an acquisition module configured to acquire at least one tactile interaction by a user, detected by the touch-sensitive surface, and a determining module configured to determine a display operation as a function of the acquired tactile interaction.
When the tactile interaction is a tap on a selectable zone or a swipe between a first selectable zone and a second selectable zone, then the determined operation is a selection operation of the corresponding selectable zone.
When the tactile interaction is a swipe from a non-selectable zone, then the determined operation depends on the direction of the swipe.

18 Claims, 2 Drawing Sheets

(56) References Cited

U.S. PATENT DOCUMENTS

| | | | |
|---|---|---|---|
| 2015/0046866 A1* | 2/2015 | Shimadate | G06F 3/0485 715/776 |
| 2016/0179324 A1 | 6/2016 | Santos-Gomez | |
| 2019/0354257 A1* | 11/2019 | Yoshii | G06F 3/0412 |

* cited by examiner

DISPLAY DEVICE, DISPLAY SYSTEM COMPRISING SUCH A DEVICE, RELATED DISPLAY METHOD AND COMPUTER PROGRAM

CROSS-REFERENCE TO RELATED APPLICATIONS

This application is a U.S. non-provisional application claiming the benefit of French Application No. 19 03986, filed on Apr. 15, 2019, which is incorporated herein by reference in its entirety.

FIELD

The present invention relates to a device for displaying data on a display screen, the display device being able to be linked to a touch-sensitive surface and to the display screen.

The invention also relates to a data display system, in particular configured to be embedded in an aircraft, comprising a display screen, a touch-sensitive surface and such a display device linked to the touch-sensitive surface and the screen.

The invention also relates to a method for displaying data on a display screen, the method being implemented by an electronic display device able to be linked to a touch-sensitive surface and to the display screen.

The invention also relates to a non-transitory computer-readable medium including a computer program including software instructions which, when executed by a computer, implement such a display method.

The invention relates to the field of data display systems, preferably suitable for being embedded in an aircraft, in particular in an aircraft cockpit.

The invention in particular relates to the field of display devices included in these data display systems, in particular touch-sensitive screens.

BACKGROUND

A display device of the aforementioned type is then known, including a determining module configured to determine display operations as a function of the tactile interaction acquired by an acquisition module. The determining module of such a device is generally able to determine whether the tactile interaction by a user is a tap or a swipe as a function of the span of the tactile interaction.

However, in the turbulent environment of an aircraft cockpit, such a display device finds it difficult to discriminate between a deliberate swipe and an involuntary swipe by an operator, which is not fully satisfactory when the operator is interacting with critical data.

SUMMARY

The aim of the invention is then to propose a display device that is better able to discriminate between a deliberate swipe and an involuntary swipe by the user on a touch-sensitive interface.

To that end, the invention relates to a device for displaying data on a display screen, the display device being able to be linked to a touch-sensitive surface and to the display screen and comprising:

- an acquisition module configured to acquire at least one tactile interaction of a user, detected by the touch-sensitive surface,
- a determining module configured to determine a display operation as a function of the acquired tactile interaction,
  when the tactile interaction is a tap on a selectable zone or a swipe between a first selectable zone and a second selectable zone, then the determined operation is a selection operation of the corresponding selectable zone, and
  when the tactile interaction is a swipe from a non-selectable zone, then the determined operation depends on the direction of the swipe.

According to other advantageous aspects of the invention, the display device comprises one or more of the following features, considered alone or according to all technically possible combinations:

- when the tactile interaction is a swipe from a non-selectable zone, then the operation is determined as a function of the direction of the swipe among a scrolling operation of data displayed in a display zone and a selection operation of a corresponding selectable zone, the selection operation further being determined if the swipe ends on said selectable zone;
- when the tactile interaction is a swipe from a non-selectable zone, if the swipe forms, relative to a predefined scrolling direction, an angle smaller than a predefined threshold angle, then the determined operation is a data scrolling operation in a display zone; and if the swipe forms, relative to said predefined scrolling direction, an angle greater than or equal to a predefined threshold angle and the swipe ends on a selectable zone, then the determined operation is a selection operation of the corresponding selectable zone; the predefined threshold angle preferably being between 30° and 60°, still more preferably substantially equal to 45°;
- the determining module is configured to consider the tactile interaction to be a tap when the tactile interaction extends against the touch-sensitive surface over a distance smaller than a threshold distance of between 7 mm and 12 mm, the determining module being configured to consider the tactile interaction to be a swipe otherwise;
- the determining module is configured to select the selectable zone in which the tactile interaction ends when the operation determined by the determining module is a selection operation;
- when the tactile interaction is the tapping of a non-selectable zone or the swipe forms, relative to a predefined scrolling direction, an angle greater than or equal to a predefined threshold angle, with the swipe ending on a non-selectable zone, then the determining module is configured to determine no display operation; and
- the device further comprises a display module configured to display the determined operation on the display screen.

The invention also relates to a data display system, in particular configured to be embedded in an aircraft, the display system comprising a display screen, a touch-sensitive surface, and a device for displaying information on the display screen, the display device being linked to the touch-sensitive surface and to the screen, the display device being a device as defined above.

The invention also relates to a method for displaying data on a display screen, the method being implemented by an electronic display device able to be linked to a touch-sensitive surface and to the display screen and comprising the following steps:

acquiring at least one tactile interaction of a user, detected by the touch-sensitive surface, determining a display operation as a function of the acquired tactile interaction, when the tactile interaction is a tap on a selectable zone or a swipe between a first selectable zone and a second selectable zone, then the determined operation is a selection operation of the corresponding selectable zone, when the tactile interaction is a swipe from a non-selectable zone, then the determined operation depends on the direction of the swipe.

The invention also relates to a non-transitory computer-readable medium including a computer program including software instructions which, when executed by a computer, implement a method as defined above.

BRIEF DESCRIPTION OF THE DRAWINGS

These features and advantages of the invention will appear more clearly upon reading the following description, provided solely as a non-limiting example, and done in reference to the appended drawings, in which:

FIG. 3 is a flowchart of the data display method according to the invention.

DETAILED DESCRIPTION

In the remainder of the disclosure, the expression "substantially equal to" defines a relationship of equality to within plus or minus 10%, preferably to within plus or minus 5%.

Figure 1:
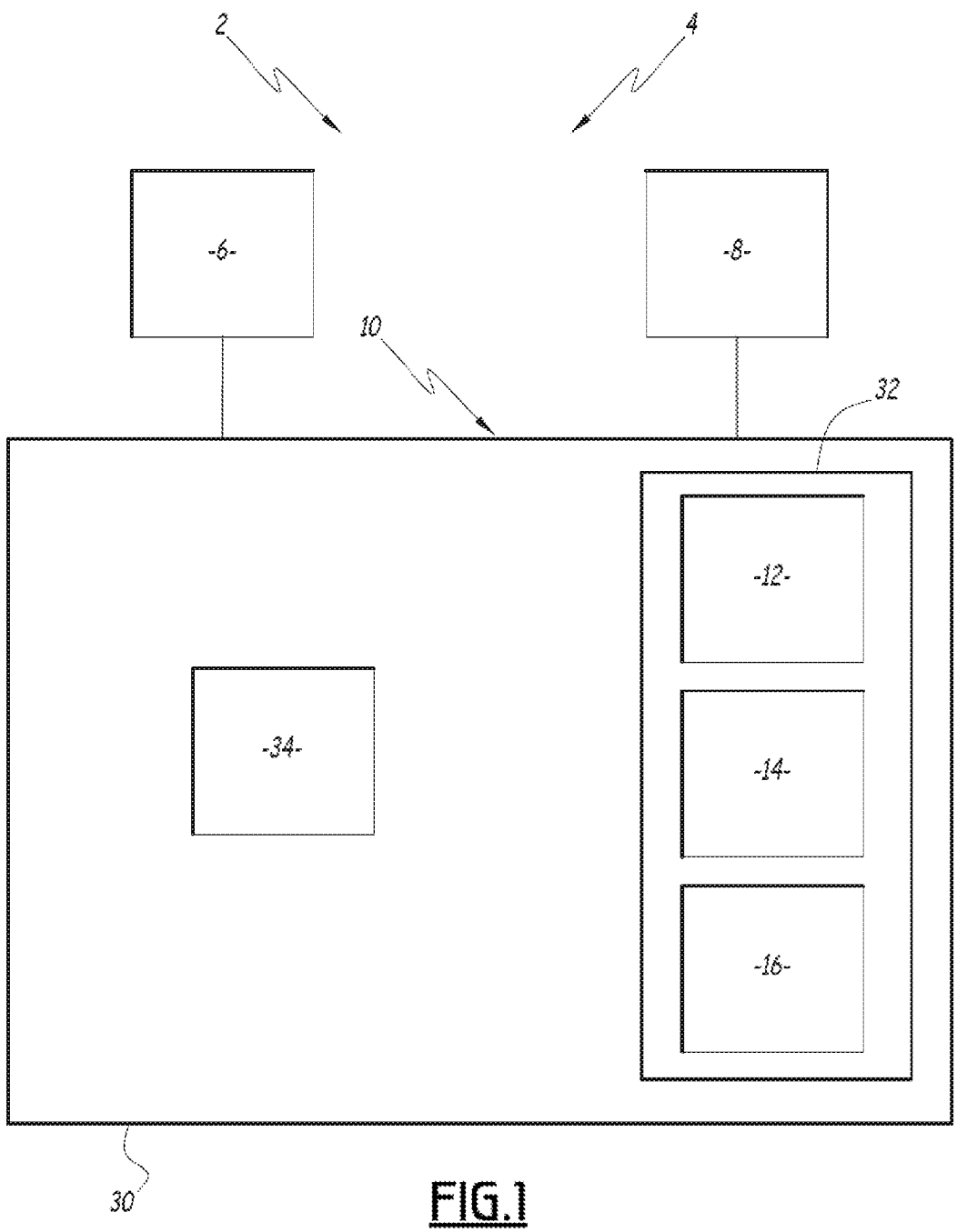
FIG. 1 is a schematic illustration of an aircraft equipped with an electronic data display system according to the invention, comprising a display screen, a touch-sensitive surface and an electronic device for displaying information on the display screen.

In FIG. 1, an aircraft 2 comprises an electronic data display system 4, including a display screen 6, a touch-sensitive surface 8 and an electronic device 10 for displaying data on the display screen 6. The data display device 10 is linked to the display screen 6 and the touch-sensitive surface 8.

The aircraft 2 is preferably an airplane. In a variant, the aircraft 2 is a helicopter or a drone.

In the example of FIG. 1, the display device 10 is embedded in the aircraft 2. The data display device 10 comprises a module 12 for acquiring at least one tactile interaction by a user, detected by the touch-sensitive surface 8; a module 14 for determining an operation as a function of the acquired tactile interaction; and a module 16 for displaying, on the display screen 6, the operation determined by the determining module 1.

In the example of FIG. 1, the display device 10 comprises an information processing unit 30 for example made up of a memory 32 associated with a processor 34.

In the example of FIG. 1, the acquisition module 12, the determining module 14 and the display module 16 are each made in the form of software able to be run by the processor 34. The memory 32 is then able to store acquisition software for at least one tactile interaction by a user, software for determining an operation and software for displaying the determined operation. The processor 34 of the information processing unit 30 is then able to run the acquisition software, the determining software and the display software.

In a variant that is not shown, the acquisition module 12, the determining module 14 and the display module 16 are each made in the form of a programmable logic component, such as an FPGA (Field Programmable Gate Array), or in the form of a dedicated integrated circuit, such as an ASIC (Application-Specific Integrated Circuit).

When the electronic display device 10 is made in the form of one or several software programs, i.e., in the form of a computer program, it is further able to be stored on a medium, not shown, readable by computer. The computer-readable medium is for example a medium suitable for storing electronic instructions and able to be linked with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 2:
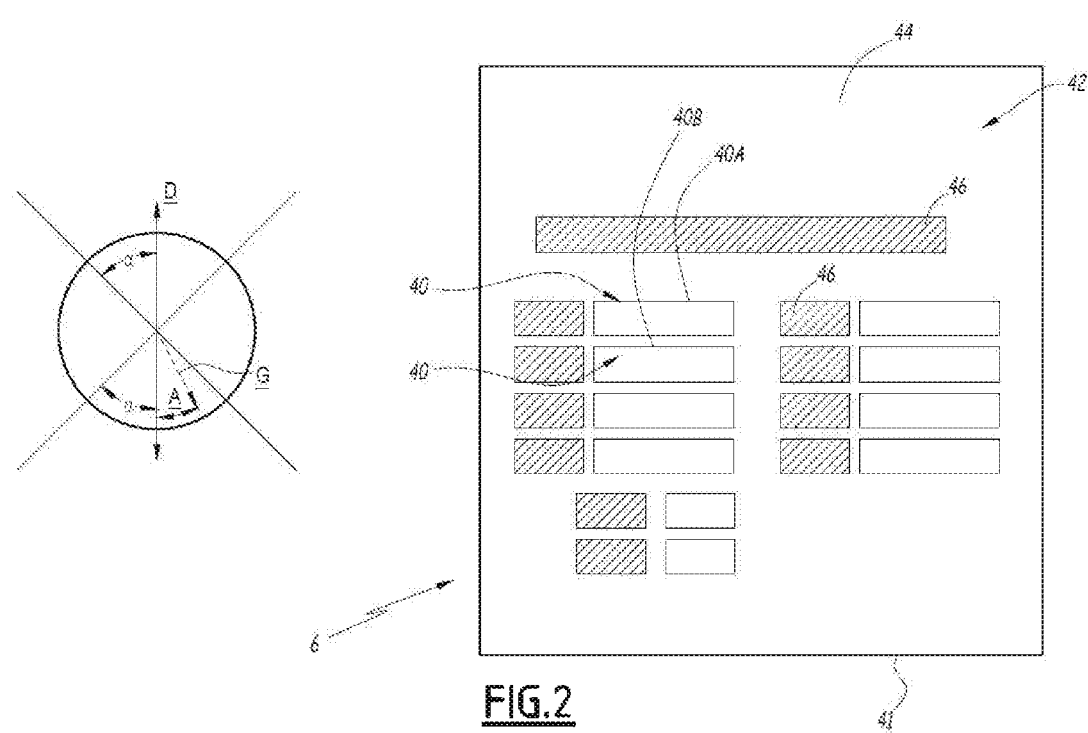
FIG. 2 is an illustration of the direction of a tactile interaction as well as a view displayed on the screen.

An example of display data visible on the screen 6 is illustrated in FIG. 2. The display data for example comprise several selectable zones 40 as well as several non-selectable zones 42. The non-selectable zones 42 for example include a non-selectable background 44 and/or a non-selectable display field 46.

The touch-sensitive surface 8 is for example a capacitive touch-sensitive surface, typically placed on the display screen 6. The display screen 6 combined with the touch-sensitive surface 8 forms a touch-sensitive screen. In a variant, the touch-sensitive surface 8 is a trackpad separate from the display screen 6.

The acquisition module 12 is configured to acquire at least one tactile interaction by a user. The tactile interaction by the user is for example detected by the touch-sensitive surface 8.

In addition, the acquisition module 12 is configured to acquire the position of the at least one tactile interaction over time, preferably of each interaction as a function of successive moments in time.

The determining module 14 is configured to discriminate between the tactile interactions of the user according to two types of interaction, a first type of interaction being a tap and the second type of interaction being a swipe.

The determining module 14 is configured in order, from the interaction acquired by the acquisition module 12, to determine an operation to be displayed on the screen 6. The operation to be displayed on the screen 6 is for example a selection operation of a respective selectable zone 40 or a scrolling operation of the data displayed in a display zone 41, the display zone 41 being the zone inside which the display data are visible on the screen 6.

The selection operation for example corresponds to the operation triggered following the pressing on a button displayed on the screen 6 or following the selection of an entry field for an entry. The selection operation is for example able to trigger the display of a new data window or an entry keyboard.

In the remainder of the disclosure, when the determined operation is a selection operation, the determining module 14 is configured to select the selectable zone 40 in which the tactile interaction ends. In other words, the determining module is configured to determine a selection operation of the zone in which the user completes his tactile interaction, that is to say, the last zone against which his finger is in contact with the touch-sensitive surface 8 before he moves it away from the touch-sensitive surface 8.

The scrolling operation is able to trigger the scrolling of data displayed on the display screen 6 along a scrolling direction D shown in FIG. 2. Following the display of the scrolling operation, certain data previously displayed leave the display zone 41 of the screen 6 and are therefore hidden, while certain data previously hidden become visible in the display zone 41 of the screen 6 and are therefore displayed. The scrolling operation is also able to trigger the display of a resizing of certain objects displayed on the screen 6, for example of the entry keyboard displayed on the screen 6.

When the scrolling operation is determined by the determining module 14, the determining module 14 is configured so that the operation remains the scrolling operation until the end of the tactile interaction, that is to say, until the end of the corresponding tactile swipe, in particular until the user moves his finger away from the touch-sensitive surface 8.

The determining module 14 is for example configured to consider the tactile interaction to be a tap if it extends against the touch-sensitive surface 8 over a distance below a threshold distance. The determining module 14 is configured to consider the tactile interaction to be a swipe in the complementary case, that is to say, if it extends against the touch-sensitive surface 8 over a distance above the threshold distance. The value of the threshold distance is for example between 7 mm and 12 mm.

The determining module 14 is then configured to consider that the tactile interaction is a tap when the user interacts with the touch-sensitive surface 8 over a limited region and that the amplitude of the swipe of his finger on the touch-sensitive surface 8 does not exceed the threshold distance, and otherwise to consider that the tactile interaction is a swipe.

The determining module 14 is configured, if the tactile interaction is a tap, to determine either a selection operation of a selectable zone 40, or no display operation. The determining module 14 is in particular configured, if the tactile interaction is a tap of a selectable zone 40, to determine a selection operation of the corresponding selectable zone 40. The determining module 14 is also configured, if the tactile interaction is a tap of a non-selectable zone 42, to determine no display operation.

The determining module 14 is configured, if the tactile interaction is a swipe, to determine either a selection operation, or a swipe operation, or no display operation.

The determining module 14 is for example configured, if the tactile interaction is a swipe between two selectable zones 40, namely a first selectable zone denoted 40A and a second selectable zone denoted 40B, to determine a selection operation of the corresponding selectable zone 40. The determining module 14 is for example configured to select the selectable zone 40 on which the tactile interaction ends, in other words, the second selectable zone 40B.

The determining module 14 is configured, if the tactile interaction is a swipe between a selectable zone 40 and a non-selectable zone 42, to determine no display operation.

The determining module 14 is configured, if the tactile interaction is a swipe from a non-selectable zone 42, that is to say, if the first point of contact between the user and the touch-sensitive surface 8 is a non-selectable zone 42, to determine an operation from among a scrolling operation and a selection operation of the corresponding selectable zone 40, or to determine no display operation.

The determining module 14 is in particular configured, if the tactile interaction is a swipe, to determine the display operation as a function of an angle A relative to a predefined threshold angle α, the angle A being the angle between a direction of the swipe, shown by an arrow G in FIG. 2, and the scrolling direction D. The value of the threshold angle α is configurable. The value of the threshold angle α is typically between 30° and 60°. The value of the threshold angle α is for example substantially equal to 45°.

The angle A of a respective swipe is for example determined by the angle between the scrolling direction D and the segment formed by a departure point of the swipe, also called starting point of the swipe, and the point of arrival of the swipe, also called endpoint of the swipe.

The determining module 14 is configured to determine a scrolling operation if the swipe starts on a non-selectable zone 42 and if the angle A formed between the swipe and the scrolling direction D is smaller than the threshold angle α. The determining module 14 is, in this case, configured to determine a scrolling operation, it being of little importance whether the swipe ends in a selectable zone 40 or a non-selectable zone 42.

The determining module 14 is configured to determine a selection operation if the swipe starts on a non-selectable zone 42, if the angle formed between the swipe and the scrolling direction D is greater than or equal to the threshold angle α, and if the swipe ends on a selectable zone 40.

The determining module 14 is configured to determine no operation if the swipe starts on a non-selectable zone 42, if the angle formed between the swipe and the scrolling direction D is greater than or equal to the threshold angle α, and if the swipe ends on a non-selectable zone 42.

The operations determined by the determining module 14 as a function of the interactions acquired by the acquisition module 12 are summarized in the table below.

| Case | Acquired interaction | Determined operation |
| --- | --- | --- |
| Case 1 | Tap selectable zone 40 | Selection selectable zone 40 |
| Case 2 | Tap non-selectable zone 42 | No operation |
| Case 3 | Swipe between two selectable zones 40 | Selection of one of the two selectable zones 40 (for example, the selectable zone 40 of arrival) |
| Case 4 | Swipe between a selectable zone 40 and a non-selectable zone 42 | No operation |
| Case 5 | Swipe beginning on a non-selectable zone 42 and with an angle A smaller than threshold angle α | Scrolling of the display data |
| Case 6 | Swipe beginning on a non-selectable zone 42, with angle A larger than threshold angle α and swipe ending on a selectable zone 40 | Selection of the selectable zone 40 |
| Case 7 | Swipe beginning on a non-selectable zone 42, with angle A larger than threshold angle α and swipe ending on a non-selectable zone 42 | No operation |

The display module 16 is configured to display, on the display screen 6, all of the operations determined by the determining module 14.

In FIG. 3, the display method 100 begins with an acquisition step 110 for acquiring at least one tactile interaction by a user, detected by the touch-sensitive surface 8.

During the acquisition step 110, the acquisition module 12 acquires a tactile interaction. In the case where the display screen 6 is combined with the touch-sensitive surface 8 to form a touch-sensitive screen, the user touches the surface of the screen 6 to interact with the displayed data. The user for example touches at least one respective selectable zone 40 and/or at least one respective non-selectable zone 42.

Step 110 is followed by a step 130 for determining a display operation, during which the determining module 14 determines said operation to be displayed among the selection operation, the swipe operation or no display operation.

The determining step 130 includes a tap test sub-step 132, during which the determining module 14 determines whether the tactile interaction is a tap or a swipe. In particular, the determining module 14 determines whether the tactile interaction extends over more than the threshold distance on the touch-sensitive surface 8. If the test of the sub-step 132 is positive, that is to say, if the tactile interaction is a tap, or in other words, if the tactile interaction extends over less than the threshold distance, then the determining module 14 goes to a sub-step 134 testing the arrival in the selectable zone of the tactile interaction. If the test of the sub-step 132 is negative, that is to say, if the tactile interaction is a swipe, or in other words, if the tactile interaction extends over more than the threshold distance, then the determining module 14 goes to a sub-step 140 testing the beginning in the selectable zone of the tactile interaction.

During the arrival test sub-step 134, the determining module 14 determines whether the tactile interaction ends on a selectable zone 40 or on a non-selectable zone 42, in other words, if the last zone against which the user's finger is in contact with the touch-sensitive surface 8 before it moves away from the latter is on a selectable zone 40 or on a non-selectable zone 42. If the test is positive, that is to say, if the tactile interaction ends on a selectable zone 40, then the determining module 14 goes to a sub-step 136 for selection of the selectable zone. If the test is negative, that is to say, if the tactile interaction ends on a non-selectable zone 42, then no operation is performed, or in other words, a step 138, during which an absence of display operation to be determined is deduced.

During the selection sub-step 136, the determining module 14 determines a selection operation of the corresponding selection zone 40. A set of display data associated with the selection operation is then for example generated by the determining module 14. In particular, the corresponding selection zone 40 is selected and is for example highlighted or emphasized and/or new display data are generated.

Following the selection sub-step 136, a display data display step 150 is carried out. During the display step 150, the display module 16 displays the display data previously generated on the screen 6, in particular the display data from the operation determined during the determining step 130 by the determining module 14.

During the start test sub-step 140, the determining module 14 determines whether the tactile interaction starts on a selectable zone 40 or on a non-selectable zone 42, in other words, whether, at the beginning of the user's tactile interaction, the user is touching a selectable zone 40 or a non-selectable zone 42. If the test is positive, that is to say, if the tactile interaction starts in a selectable zone 40, then the determining module 14 goes to the arrival test sub-step 134. If the test during sub-step 140 is negative, that is to say, if the tactile interaction starts in a non-selectable zone 42, then the determining module 14 goes to a swipe test sub-step 142 along the scrolling direction D.

During the swipe test sub-step along the scrolling direction 142, the determining module 14 determines whether the swipe forms an angle smaller than the predefined threshold angle α with the scrolling direction D. If the test is positive, that is to say, if the swipe forms an angle smaller than the threshold angle α with the scrolling direction, then the determining module 14 goes to the scrolling sub-step 144. If the test is negative, that is to say, if the swipe forms an angle greater than or equal to the threshold angle α with the scrolling direction D, then the determining module 14 goes to the arrival test sub-step 134.

During the scrolling sub-step 144, the determining module 14 determines a scrolling operation. In particular, the determining module 14 determines new display data corresponding to the scrolling of display data on the touch-sensitive surface 8. The new display data for example result in the translation of the data displayed on the display screen 6 or in the resizing of certain data displayed on the display screen 6, for example a display zone of the entry keyboard.

Following sub-step 144, the display module 16 displays, on the display screen 6, the display data during step 150.

After the display step 150, the display device 10 returns to the acquisition step 110, to account for a new tactile interaction.

Likewise, after sub-step 138, the display device 10 returns to the acquisition step 110.

The data display device 10 and the display system 4 according to the invention in particular made it possible to ensure that the interactions by the user, in particular by one or several of his fingers, against the touch-sensitive surface 8 are processed taking the environment in which they occur into account. In particular, following a swipe on the touch-sensitive surface 8, the display device 10 is configured to determine the operation to be displayed as a function of the direction of the swipe on the touch-sensitive surface 8. This thus makes it possible to improve the discrimination between a deliberate swipe and an involuntary swipe, and then to determine the desired operation with greater precision.

The data display device 10 is in particular configured, following a swipe on the touch-sensitive surface 8, to determine the display operation among a selection operation and a scrolling operation, which thus makes it possible to perform a selection despite a swipe on the touch-sensitive surface 8. This is in particular advantageous in the turbulent environment of a cockpit of the aircraft 2, where a precise tap is sometimes difficult.

The discrimination between a selection operation and a scrolling operation following a swipe depends on the threshold angle α relative to the scrolling direction D, which makes it possible to determine the intention of the user more precisely. This threshold angle α is also configurable, which makes it possible to adapt the display device 10 to the various aircraft 2 on which it is used.

Additionally, the display device 10 is configured to determine whether the acquired interaction is a tap or a swipe, by comparing the distance over which the interaction extends to the threshold distance, which makes it possible to confirm the intention of the pilot to perform a tap and to improve the quality of the interactions between the user and the display device 10.

The display device 10 is further configured, when a selection operation is determined by the determining module 14, to select the selectable zone 40 in which the tactile interaction ends. This is particularly advantageous in the cockpit of the aircraft 2, this feature in particular allowing the user to adjust the position of his finger during the interaction in order to designate a particular zone. The user thus presses on the touch-sensitive surface 8 in order to improve the precision of his movement before moving his finger away from the touch-sensitive surface 8, in the location he wishes to select.

Following a swipe that is not oriented along the scrolling direction D, and if the latter ends on a respective non-selectable zone 42, no operation is determined by the determining module 14. This is particularly advantageous in the case where the user designates a selectable zone 40 in error. He can then abort this selection by simply continuing the tactile interaction with his finger, up to a non-selectable zone 42 and by performing a swipe that is not oriented along the scrolling direction D, the tactile interaction then becoming a swipe from a selectable zone 40 to a respective non-selectable zone 42.

One can thus see that the data display device 10 and the display method 100 according to the invention make it possible to improve the interaction with the user during the display of the data.

The invention claimed is:

1. An electronic device for displaying data on a display screen, the display device being able to be linked to a touch-sensitive surface and to the display screen, and comprising:
   an acquirer configured to acquire at least one tactile interaction of a user, detected by the touch-sensitive surface, and
   a determiner configured to determine a display operation as a function of the acquired tactile interaction,
   wherein:
   when the tactile interaction is a tap on a selectable zone or a swipe between a first selectable zone and a second selectable zone, then the determined operation is a selection operation of the tapped selectable zone or of one of the first or second selectable zone,
   when the tactile interaction is a swipe from a non-selectable zone, then the determined operation depends on a direction of the swipe,
   wherein when the tactile interaction is a swipe from a non-selectable zone, if the swipe forms, relative to a predefined scrolling direction, an angle smaller than a predefined threshold angle, then the determined operation is a data scrolling operation in a display zone; and if the swipe forms, relative to said predefined scrolling direction, an angle greater than or equal to a predefined threshold angle and the swipe ends on a selectable zone, then the determined operation is a selection operation of said selectable zone of the swipe end.

2. The display device according to claim 1, wherein when the tactile interaction is a swipe from a non-selectable zone, then the operation is determined as a function of the direction of the swipe among a scrolling operation of data displayed in a display zone and a selection operation of a corresponding selectable zone, the selection operation further being determined if the swipe ends on said selectable zone.

3. The display device according to claim 1, wherein the predefined threshold angle is between 30° and 60°.

4. The display device according to claim 3, wherein the predefined threshold angle is substantially equal to 45°.

5. The display device according to claim 1, wherein the determiner is configured to consider the tactile interaction to be a tap when the tactile interaction extends against the touch-sensitive surface over a distance smaller than a threshold distance of between 7 mm and 12 mm, the determiner being configured to consider the tactile interaction to be a swipe otherwise.

6. The display device according to claim 1, wherein the determiner is configured to select the selectable zone in which the tactile interaction ends when the operation determined by the determiner is a selection operation.

7. The display device according to claim 1, when the tactile interaction is the tapping of a non-selectable zone or the swipe forms, relative to a predefined scrolling direction, an angle greater than or equal to a predefined threshold angle, with the swipe ending on a non-selectable zone, then the determiner is configured to determine no display operation.

8. The display device according to claim 1, wherein the device further comprises a display module configured to display the determined operation on the display screen.

9. An electronic system for displaying data, the display system comprising:
   a display screen;
   a touch-sensitive surface; and
   an electronic device for displaying information on the display screen, the display device being linked to the touch-sensitive surface and the screen,
   wherein the display device is according to claim 1.

10. An electronic system according to claim 9, wherein the electronic system is intended to be embedded in an aircraft.

11. A method for displaying data on a display screen, the method being implemented by an electronic display device able to be linked to a touch-sensitive surface and to the display screen, and comprising steps:
   acquiring at least one tactile interaction by a user, detected by the touch-sensitive surface,
   determining a display operation as a function of the acquired tactile interaction,
   wherein:
   when the tactile interaction is a tap on a selectable zone or a swipe between a first selectable zone and a second selectable zone, then the determined operation is a selection operation of the tapped selectable zone or of one of the first or second selectable zone,
   when the tactile interaction is a swipe from a non-selectable zone, then the determined operation depends on a direction of the swipe,
   wherein when the tactile interaction is a swipe from a non-selectable zone, if the swipe forms, relative to a predefined scrolling direction, an angle smaller than a predefined threshold angle, then the determined operation is a data scrolling operation in a display zone; and if the swipe forms, relative to said predefined scrolling direction, an angle greater than or equal to a predefined threshold angle and the swipe ends on a selectable zone, then the determined operation is a selection operation of said selectable zone of the swipe end.

12. A non-transitory computer-readable medium including a computer program comprising software instructions which, when executed by a computer, carry out a method according to claim 11.

13. The method according to claim 11, wherein when the tactile interaction is a swipe from a non-selectable zone, then the operation is determined as a function of the direction of the swipe among a scrolling operation of data displayed in a display zone and a selection operation of a corresponding selectable zone, the selection operation further being determined if the swipe ends on said selectable zone.

14. The method according to claim 11, wherein the predefined threshold angle is between 30° and 60°.

15. The method according to claim 14, wherein the predefined threshold angle is substantially equal to 45°.

16. The method according to claim 11, further comprising the step of considering the tactile interaction to be a tap when the tactile interaction extends against the touch-sensitive surface over a distance smaller than a threshold distance of between 7 mm and 12 mm, otherwise considering the tactile interaction to be a swipe otherwise.

17. The method according to claim 11, wherein when the determined operation is a selection operation, selecting the selectable zone in which the tactile interaction ends.

18. The method according to claim 11, wherein when the tactile interaction is the tapping of a non-selectable zone or the swipe forms, relative to a predefined scrolling direction, an angle greater than or equal to a predefined threshold angle, with the swipe ending on a non-selectable zone, then determining no display operation.

* * * * *